May 19, 1931.  T. COLLINS  1,806,538
METHOD FOR MEASURING THE AMOUNT OF WATER
CONTAINED IN MOIST SAND OR GRAVEL
Filed Jan. 25, 1927
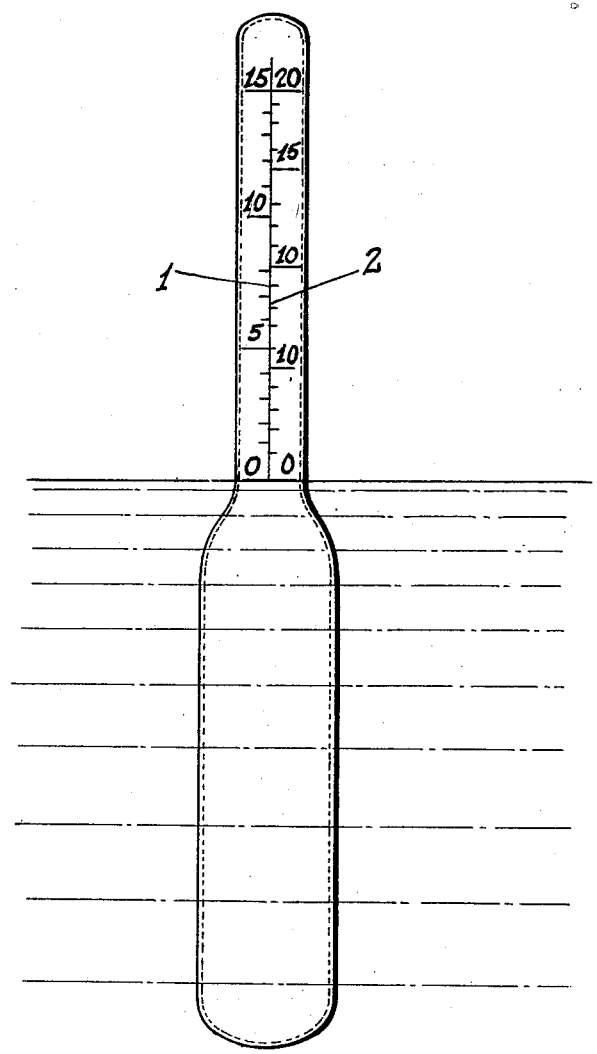

Patented May 19, 1931

1,806,538

UNITED STATES PATENT OFFICE

TAPPAN COLLINS, OF DORMONT, PENNSYLVANIA

METHOD FOR MEASURING THE AMOUNT OF WATER CONTAINED IN MOIST SAND OR GRAVEL

Application filed January 25, 1927. Serial No. 163,344.

My invention relates to improvements in methods and apparatus for measuring or ascertaining the quantity of water contained in a given volume or quantity of moist sand or gravel or other insoluble material or substance.

Heretofore, so far as I am aware, the method employed to accomplish this result consisted in first weighing a quantity of moist sand or gravel or other moist insoluble material; then by subjecting the same to heat drying and driving off the water contained therein; then by weighing the dried material and ascertaining the difference in weight between the moist insoluble material and the dried material obtaining a basis for calculating in liquid measure the amount of water contained in the moist material. This method or process was not only inapplicable in many cases but had many other disadvantages and in addition was not accurate. The object of the present invention is to produce a simpler, more expeditious, more easily applied and more accurate method than that heretofore used and to this purpose consists in the following steps, namely; first adding to a measured representative sample or volume of the moist sand or gravel or other insoluble material to be tested an equal measured quantity of a water solution of known concentration and known specific gravity the quantity of the solution being sufficient to more than inundate the sand or gravel or other insoluble material; and, second, determining by hydrometric test, the hydrometer being calibrated in standard U. S. gallons to indicate the added moisture, the amount of water thus added to the original solution. The amount of water contained in the standard volume of moist insoluble material, i. e. one cubic foot, is directly shown on the scale of the hydrometer in standard U. S. gallons or fractions thereof from which the moisture content of any given equally moist mass of the material may be readily determined.

In the application of my improved method I prefer to use a saturated solution of sodium chloride in water, because of its relatively constant solubility in water throughout a considerable range of temperatures, and because of the convenience of preparation of the solution and the rapidity with which added water is diffused throughout the solution.

In determining the quantity of water which has been added to a measured quantity of the concentrated solution by specific gravity readings as above described, it has heretofore been necessary to make certain computations to express the observed dilution in useful units of liquid measure. Instead however, of resorting to any computation to interpret the final hydrometric reading of the diluted solution, I employ a hydrometer calibrated to indicate the quantity of water expressed in U. S. standard gallons contained in one cubic foot of moist material which has been added to the original measured quantity of concentrated solution. This calibration is produced as follows: By first laying off a graduation marked zero at a point to which the stem of the hydrometer will sink in the medium, being used. I prefer to use as a medium, as heretofore herein stated, a saturated solution of sodium chloride in water because it is readily obtained in a relatively pure state and a saturated solution of the same specific gravity can readily be produced without reference to the temperature, for it is a property peculiar to sodium chloride that the specific gravity of the saturated solution of the salt in water is negligibly affected by temperatures throughout a considerable range of temperatures. It is therefore easy to bring the medium to a reading of zero on the hydrometer scale prior to making the test.

The other graduations on the hydrometer are produced by adding to a cubic foot of the saturated solution quantities of distilled water measured in gallons and marking the stem of the hydrometer at the points to which it sinks after each addition with the numbers to indicate in gallons or fractions thereof the corresponding quantity of water added.

By employing equal volumes of solution and material, I am relieved of the necessity of determining what this volume may be, and thus any convenient container of unknown capacity may be employed for the test by using the identical container for measuring both the volume of solution and the volume of the test sample. By graduating the hydrometer to indicate directly the quantity of water added per cubic foot of concentrated solution medium I avoid any computation or reduction of reading and in place of determining a basis of calculation of the contained moisture, I read directly the quantity of contained moisture in a given quantity of insoluble material expressed in U. S. gallons, as for instance one cubic foot of insoluble material or a given number of pounds of the same, which furnishes a factor by which the moisture content of any given mass of insoluble material can be readily and quickly determined.

This calibration which reduces computation to a minimum and thereby renders the within described process of great practical value on account of the expedition with which it may be applied, is novel and may be adapted to define the quantity of water contained in the insoluble material by ratio volume or by ratio weight, and is furthermore one of the essential features of the present invention, the hydrometer being calibrated in two forms.

A, a calibration indicating the quantity of added water in units of volumetric measure per unit of volumetric measure of moist material, the calibration being based upon an arbitrarily determined and fixed ratio of the volume of the moist test sample to the volume of the original concentrated solution sample; and, B, a calibration indicating the ratio of the weight of added water in the test sample to the weight of dry material contained in said sample, the calibration being based upon any desired, stated, arbitrarily determined, and fixed ratio of the weight of the moist test sample to the weight of the original concentrated solution employed.

Both of these above described calibrations may be placed on the same hydrometer scale whereby the single instrument is useful for both the first or volumetric determination and the second or weight determination.

In practicing or applying my improved method, I employ a hydrometer having preferably a plurality of calibrations, one form of said hydrometer being illustrated in the accompanying drawing forming a part hereof, in which the single figure is a front elevation thereof. Referring to said drawing, the scale 1, is calibrated to indicate directly the amount of water contained in the moist material of which the test sample is representative, said contained water being expressed in United States standard gallons per cubic foot of moist material, using for the test equal volumes of moist material and of concentrated solution. The scale 2 is calibrated to indicate directly the ratio of the weight of water contained in the moist test sample to the weight of dry material in said sample, employing for the test equal weights of moist material and of concentrated solution.

I am aware that prior to my invention hydrometers have been employed to determine the extent of dilution of aqueous solutions, and have also been constructed or provided with scales calibrated to indicate special characteristics of solutions. I therefore do not claim broadly a process for determining the extent of dilution of any aqueous solution, nor the use of a hydrometer calibrated to indicate special characteristics of solutions, but having described my invention what I claim and desire to secure by Letters Patent is:

The herein described method of determining the quantity of water contained in moist sand or gravel or other insoluble material, which consists in placing a measured representative sample of the moist sand of gravel in a measured similarly equal quantity of an aqueous solution of known concentration and known specific gravity, into which solution the water contained in the sample of insoluble material passes; then by a hydrometer test of the solution determining a factor representative of the amount of water so taken up by the solution from the sample.

In testimony whereof, I have hereunto signed my name.

TAPPAN COLLINS.